March 30, 1937.  H. G. WEISS  2,075,753
SAFETY DEVICE FOR MOTION PICTURE MACHINES
Filed April 10, 1933  2 Sheets-Sheet 1
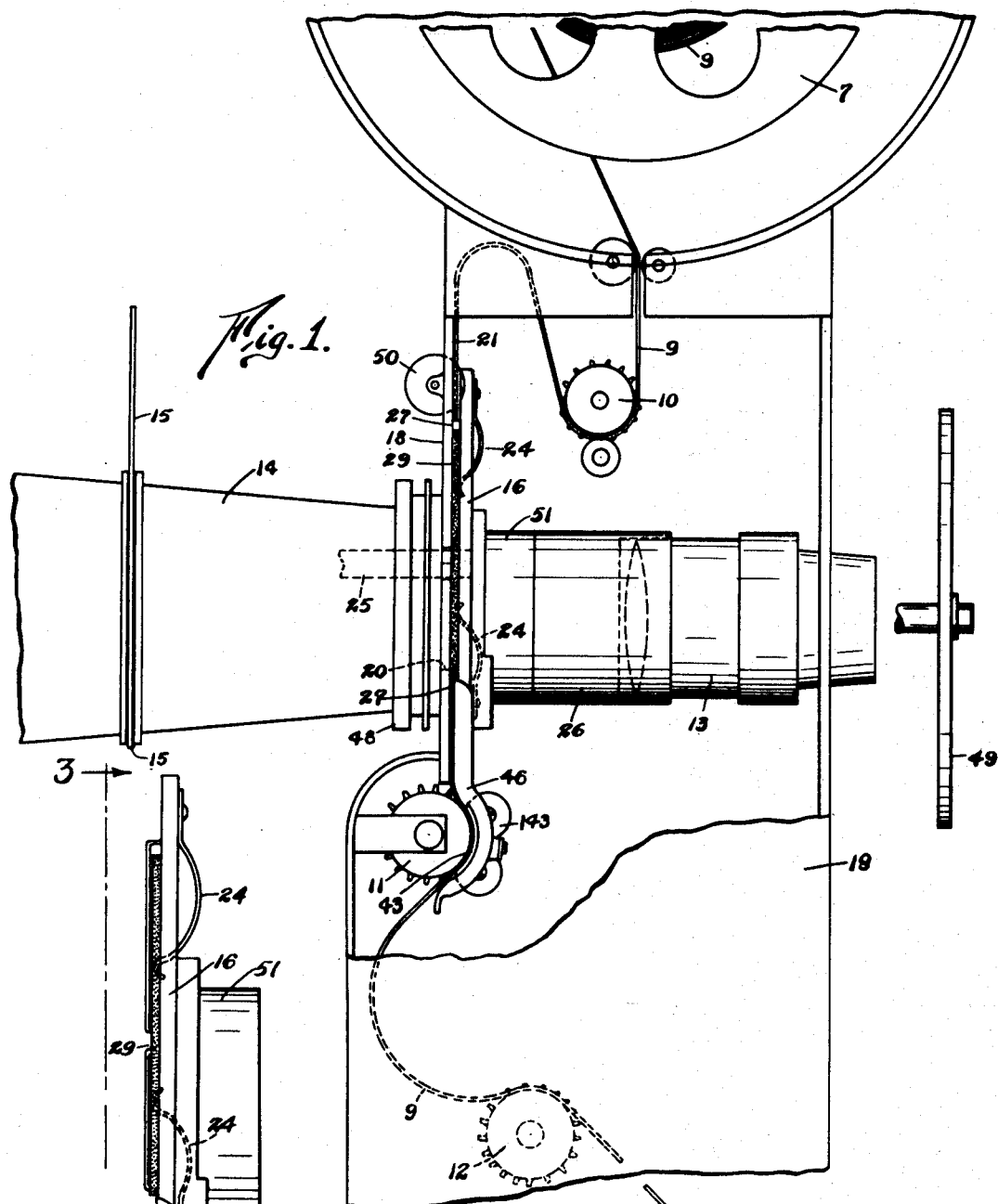
Inventor
Henry G. Weiss
By Murray and Zugelter
Attorneys

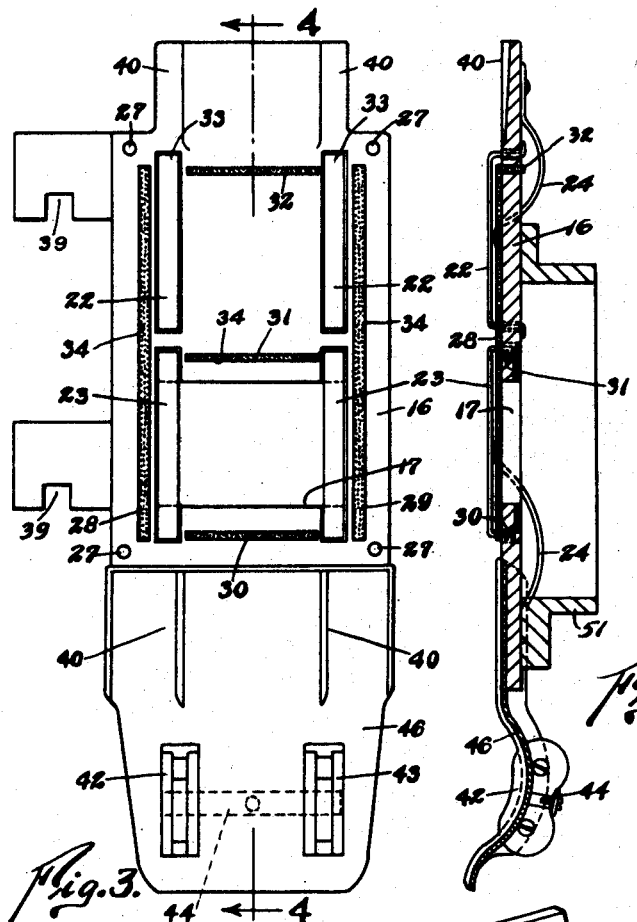
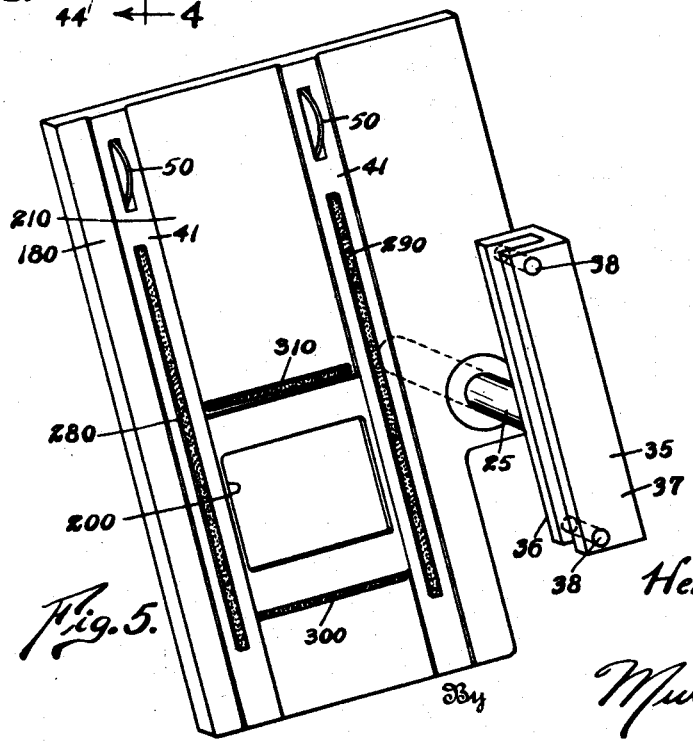

Patented Mar. 30, 1937

2,075,753

UNITED STATES PATENT OFFICE 2,075,753

SAFETY DEVICE FOR MOTION PICTURE MACHINES

Henry G. Weiss, Cincinnati, Ohio, assignor to William R. Todd, Montgomery, Ohio

Application April 10, 1933, Serial No. 665,266

9 Claims. (Cl. 88—17)

This invention relates to a safety device for precluding disastrous fires or explosions in motion picture projecting apparatus.

One object of the invention is to provide simple, inexpensive, and effective means for quickly extinguishing the flame of any burning film in a motion picture projector.

Another object of the invention is to provide a means, for the above stated purpose, which is applicable to all existing projecting machines and which requires no material alteration of standard equipment in order to perform its function.

Another object is to provide means which extinguishes fires in such a manner that the sprocket holes of the film remain intact, and as a result the performance or projection of pictures may be continued without interruption.

A further object of the invention is the provision of a safety device of the character referred to above, which has no moving parts to become disabled or noisy in operation.

A still further object is to provide a safety mechanism which will effectually preclude the spreading of fire along the film in both directions, that is, upwardly to the pay-out reel and downwardly to the receiving reel.

The foregoing and other objects are attained by the means described herein and disclosed in the accompanying drawings, in which:

Fig. 1 is a side elevational view of a motion picture projector embodying the invention, part thereof being broken away.

Fig. 2 is a side view of a film gate shown in Fig. 1, and having the means of the present invention embodied therein.

Fig. 3 is a rear view of the film gate, this being taken on line 3—3 of Fig. 2.

Fig. 4 is a cross-sectional view taken on line 4—4 of Fig. 3.

Fig. 5 is a perspective view of a film gate support, showing how the invention may alternatively be applied to the machine.

In the drawings, 7 and 8 indicate respectively the pay out and receiving reels or magazines of a motion picture projecting apparatus, 9 indicates the film wound thereon and threaded in the usual manner about the customary driving sprockets 10, 11 and 12; the character 13 indicates the lens barrel, 14, the projector portion of a lamp housing (not shown), 15, a shutter for intercepting the beam which normally passes through the member 14, and at 16 is indicated a movable plate member commonly known as the film gate, which guides and maintains the film in a flattened condition whilst it moves rapidly past the projector.

In accordance with common practice, the film gate 16 (which is in reality a plate having an aperture 17 therein for the projecting beam) is supported by a stationary part 18 of the housing 19, so that the aperture 17 of the gate coincides with the aperture 20 of the part 18, the latter being hereafter referred to as the film gate support. In its normal operative position the film gate 16 lies closely adjacent to, and in substantial parallelism with, the substantially flat forward face 21 of the film gate support, so that the face 21 and the film gate provide a space in which the film may move during transfer thereof from the reel 7 to the receiving reel 8. The film is yieldingly held against the face 21, in a properly flattened condition, by means of pairs of runners or shoes 22—23 (Fig. 3) which are urged constantly toward the face 21 by any suitable means such as springs 24. The springs and the shoes may advantageously be mounted upon the film gate, as shown.

By means of a gate actuating member 25, which in this instance is shown as a rod or bar mounted upon the film gate and passing through the member 18, the film gate may be shifted forwardly with a shiftable section 26 of the lens barrel, in order to increase the space between the face 21 and the film gate and thereby facilitate the threading of the film in the region of the aperture 20. Any suitable spacing means, for example a series of spacing lugs 27, may be provided for the purpose of spacing the film gate slightly from face 21 so that only the shoes 22 and 23 may contact the film as it passes the projector. The character of spacing means employed is immaterial, but it is desirable to provide some sort of means to preclude the entire plate 16 from bearing upon the moving film and thereby placing upon it an unnecessary strain.

In accordance with Figs. 1 to 4 inclusive, the aperture 17 (Fig. 3) and the shoes 23, are boxed in or substantially surrounded by barrier strips 28, 29, 30, and 31, of suitable material such as felt, rubber, or other substantially impervious material capable of precluding or substantially precluding access of air to the aperture region, so that any combustion of film within the aperture region will be smothered promptly due to lack of sufficient oxygen to sustain combustion. The strips 28 and 29 preferably are mounted upon the plate 16 closely adjacent to the shoes 23, and in substantial parallelism therewith. The strips 30 and 31 may be mounted upon the plate in substantial parallelism, but transversely of the plate, at a short distance from the upper and lower edges of the aperture. A third transverse strip 32 of felt or other suitable material may be mounted upon the plate between or adjacent to the upper ends 33 of the uppermost shoes 22. The strips of material above referred to may be secured in position upon the film gate by the use of any proper securing means, such as a good adhesive, or they may rest in longitudinal slots or grooves 34 formed in the body of the plate.

With the use of a film gate constructed as above described, the film may be stopped over the aperture 17 and subjected to the intense heat of the projector beam, with the result that a hole will be burned through the film without injury to the sprocket holes of the film, so that operating of the machine may be resumed without any delay whatever. It will be found also that the flame of a match may be applied to the film at a point above the film gate, and that the flaming film, upon being drawn through the substantially air-tight compartments at the usual speed of film movement, will emerge therefrom with the flame extinguished.

The results set forth in the next preceding paragraph may be attained without the use of any of the transverse strips 30, 31, and 32, the longitudinal strips 28 and 29 being apparently sufficient in effectiveness to have a smothering action upon the flaming film. Naturally, though, the more complete enclosing structure may be expected to function more reliably. It is to be observed that the smothering elements project slightly from the face of the plate 16, or sufficiently to contact the face 21 of the gate support.

An alternative construction is illustrated by Fig. 5, wherein 180 indicates the film gate support and 200 indicates the aperture corresponding to aperture 20 of Fig. 1. Here the strips of smothering material 280, 290, 300, and 310 are mounted upon the face 210 of the film gate support, instead of upon the film gate, so as to provide a substantial air seal at the sides and ends of the aperture. The character 35 indicates a holder mounted upon the gate actuating member 25, said holder being constituted of a pair of spaced legs 36 and 37 having pins or supports 38 extending between them, these pins being adapted to engage the hanger slots 39 (Fig. 3) of a film gate. The manner in which the slots engage the pins 38 for mounting the film gate of Fig. 3, should readily be evident by referring to Figs. 3 and 5; the Fig. 3 structure would of course have to be rotated 180 degrees in order to hang it upon the pins 38.

The slightly raised portions 40 and 41 of Figs. 3 and 5, respectively, provide narrow tracks upon which the side edges of the film may ride as it moves through the gate structure, and the elements 42 and 43 of Fig. 3 indicate curved shoes which yieldingly urge the film edges toward the intermittent sprocket wheel 11 of Fig. 1. The spring 44 serves to maintain the curved shoes in a yieldingly extended position. The curved portion of the film gate may be provided by means of a separate plate or stamping 46 which is clinched or otherwise secured to the body plate as indicated at 47 in Fig. 2.

The characters 48 and 49 indicate, respectively, the usual cooling grid and flipper shutter of a conventional motion picture machine, and guide rollers for the film are indicated at 50 in Figs. 1 and 5. The element 51 is merely a short length of lens barrel mounted upon the plate 16 so as to coincide with the shiftable section 26.

From the foregoing it should be apparent that I have provided a very simple safety device for minimizing the fire hazard in connection with motion picture operation, and that the improvement most desirably affords fire protection for the sprocket holes of a film, so that a fire resulting from jamming of the film driving mechanism would not so damage the film as to necessitate a shut-down until film repairs could be effected.

It is to be understood that various modifications and changes in structural details of the device may be made, within the scope of the claims, without departing from the spirit of the invention.

What is claimed is:

1. A motion picture projecting apparatus having in combination an apertured projector for casting a beam of intense concentrated light through a length of normally moving combustible film having side edge portions bounding the central picture portion of the film, an apertured film gate plate, means for moving the film past the apertures of the gate plate and the projector and in the path of the concentrated light beam, spaced tracks adjacent to the projector aperture and upon which the side edges of the film may ride during movement of the film past the aperture, yieldingly urged shoe members having solid faces for contacting the side edges of the film and maintaining said side edges in contact upon the tracks, whereby to provide a protective closely fitting cover for the side edges of the film, and a pair of barrier members normally extending longitudinally of the tracks slightly outwardly therefrom and closely adjacent but exteriorly of the shoe members, for limiting access of air to the region of the projector aperture when the film gate plate is positioned to cover said barrier members, to the extent that insufficient air is admitted to sustain combustion of the film at the side edges thereof in the region of said aperture.

2. A motion picture projecting apparatus having in combination an apertured projector for casting a beam of concentrated light through a length of normally moving combustible film having side edge portions bounding the central picture portion of the film, means for moving the film past the aperture of the projector and in the path of the light beam, spaced track members adjacent to the aperture and upon which the side edges of the film may ride during movement of the film past the aperture, a film gate plate including yieldingly urged shoe members having faces for contacting the side edges of the film and maintaining said side edges in contact upon the track members, whereby to provide a closely fitting protective cover for the side edges of the film, and a series of compressible barrier members at least two of which normally extend longitudinally of the track members exteriorly of the shoes and compressed between the track members and the film gate plate, so as to limit access of air to the region of the shoe members to the extent of precluding such free access of air to the shoe member region as would sustain film combustion, and means for disposition of the other barrier members transversely of and substantially between the longitudinally extended barrier members, for lightly wiping a face of the moving film.

3. As a new article of manufacture a film gate member for motion picture projecting apparatus comprising a plate having an aperture therein for the passage of a projected beam of light, vertical film engaging spring members mounted alongside the aperture of the plate, strips of compressible material substantially impervious to air, disposed adjacent to but exteriorly of the spring members and two opposed edges of the aperture, and a strip of substantially impervious compressible material mounted upon the plate along the other two opposed edges of the aperture, said strips serving to provide a substantially continuous border about the aperture for limiting access of air to the aperture when the plate is in use.

4. A motion picture projecting apparatus including means for precluding sprocket hole destruction and film separation in the event of film combustion, and comprising an apertured projector for casting a beam of intensely concentrated light through a length of normally moving combustible film having sprocket holes formed along its side edges, means for moving the film past the aperture of the projector and in the path of the concentrated light beam, a film gate plate, spaced tracks associated with the projector upon which said side edges of the film may ride during movement of the film past the aperture, substantially flat shoes carried by the gate plate and positioned for covering said sprocket hole portions of the film and closely holding them against the spaced tracks upon which the film side edges ride, and a pair of compressible members substantially impervious to air mounted upon the gate plate to extend longitudinally of the tracks and exteriorly of the shoes in close proximity therewith, when the gate plate is in position over the projector aperture, for reducing lateral flow of air in the region of the projector aperture so as to smother any flaming of the film before combustion occurs at the sprocket hole portions of the film.

5. Means for precluding sprocket hole destruction and film separation in a motion picture projector whenever film combustion occurs therein, said means comprising, in combination with the projector, an apertured film gate support, a film gate having a corresponding aperture and mounted for shifting movement toward and from the support, means providing a film track portion between the gate and the gate support, over which the moving film may ride, strips of air sealing material normally compressed between the gate and the gate support, and disposed alongside the track portion at opposite sides of one of the apertures, said strips being spaced apart sufficiently to avoid contact with the marginal portions of a film while the gate is in an operative position close to the gate support, other strips of air sealing material arranged transversely of the film and cooperating with the first mentioned strips to substantially bound that portion of the film which registers with the apertures, and oppositely extended light beam housings in substantially air-tight relationship with the apertures of the film gate and the gate support, respectively.

6. A motion picture projecting apparatus including means for precluding sprocket hole destruction and film separation in the event of film combustion, and comprising a film gate support having a film track with outer edges, and an extensive apertured area in substantially the plane of the track, as a backing for the film, a film gate plate having an aperture therein to register with the aperture of the gate support, said gate plate being otherwise substantially free of openings exposing the film to atmospheric air, compressible air sealing strips disposed between the gate support and the gate plate, and substantially bounding closely the outer edges of the film track with sufficient clearance to be free of interference with film movement, and to preclude a free lateral flow of air in the plane of the gate support and the gate plate apertures.

7. A motion picture projecting apparatus including means for precluding sprocket hole destruction and film separation in the event of film combustion, and comprising a film gate support having a film track, and an extensive apertured area in substantially the plane of the track, as a backing for the film, a film gate plate having an aperture therein to register with the aperture of the gate support, said gate plate being otherwise substantially free of openings exposing the film to atmospheric air, compressible air sealing strips disposed between the gate support and the gate plate, and substantially bounding one of said apertures to preclude a free lateral flow of air in the plane of the gate support and the gate plate apertures, and oppositely extended light beam housings in substantially air-tight relationship with the apertures of the film gate and the gate support, respectively.

8. A motion picture projecting apparatus including means for precluding sprocket hole destruction and film separation in the event of film combustion, and comprising an apertured projector for casting a beam of intensely concentrated light through a length of normally moving combustible film having sprocket holes formed along its side edges, means for moving the film past the aperture of the projector and in the path of the concentrated light beam, a film gate plate, spaced tracks associated with the projector upon which said side edges of the film may ride during movement of the film past the aperture, film edge presser means carried by the gate plate and positioned for covering said sprocket hole portions of the film and closely holding them against the spaced tracks upon which the film side edges ride, and a pair of compressible members substantially impervious to air mounted between the gate plate and the projector, alongside of the spaced tracks, to extend longitudinally of the tracks and exteriorly of the film edge presser means in close proximity therewith, when the gate plate is in position over the projector aperture, for reducing lateral flow of air in the region of the projector aperture so as to smother any flaming of the film before combustion occurs at the sprocket hole portions of the film.

9. A motion picture projecting apparatus having in combination an apertured projector for casting a beam of intense concentrated light through a length of normally moving combustible film having side edge portions bounding the central picture portion of the film, an apertured film gate plate with its aperture coinciding with the projector aperture, means for moving the film past the apertures of the gate plate and the projector and in the path of the concentrated light beam, spaced tracks adjacent to the projector aperture and upon which the side edges of the film may ride during movement of the film past the aperture, presser members having faces contacting the side edges of the film and maintaining said edges in contact upon the tracks, whereby to provide a protective closely fitting cover for the side edges of the film, and a pair of fibrous resilient barrier members normally extending longitudinally of the tracks and slightly outwardly therefrom, so as to be closely adjacent but exteriorly of the presser members, and having sufficient clearance, relative to the tracks, to be free of interference with film movement along said tracks, and serving to limit access of air to the region of the said apertures when the film gate plate is in position to cover said barrier members.

HENRY G. WEISS.